United States Patent
Taylor

(10) Patent No.: US 7,035,246 B2
(45) Date of Patent: Apr. 25, 2006

(54) MAINTAINING A GLOBAL TIME REFERENCE AMONG A GROUP OF NETWORKED DEVICES

(75) Inventor: James L. Taylor, Epone (FR)

(73) Assignee: Pulse-LINK, Inc., Carlsbad, CA (US)

( * ) Notice: Subject to any disclaimer, the term of this patent is extended or adjusted under 35 U.S.C. 154(b) by 904 days.

(21) Appl. No.: 09/805,735

(22) Filed: Mar. 13, 2001

(65) Prior Publication Data

US 2002/0131398 A1    Sep. 19, 2002

(51) Int. Cl.
*H04J 3/06* (2006.01)
*G06F 13/28* (2006.01)
*G06F 1/12* (2006.01)

(52) U.S. Cl. .................. 370/350; 370/503; 710/25; 713/400; 713/401

(58) Field of Classification Search ............. 370/350, 370/503–507, 509, 512, 510–523; 455/502; 375/242, 340; 710/25; 713/400, 401
See application file for complete search history.

(56) References Cited

U.S. PATENT DOCUMENTS

| | | | | |
|---|---|---|---|---|
| 4,201,892 A | 5/1980 | Schmidt | ............... | 370/104 |
| 4,586,177 A | 4/1986 | Kaul | ............... | 370/104 |
| 4,587,494 A | 5/1986 | Widlar | ............... | 330/273 |
| 4,887,266 A | 12/1989 | Neve et al. | ............... | 370/95.1 |
| 4,979,186 A | 12/1990 | Fullerton | ............... | 375/23 |
| 5,146,616 A | 9/1992 | Tang et al. | ............... | 455/103 |
| 5,235,619 A * | 8/1993 | Beyers et al. | ............... | 375/260 |
| 5,253,202 A | 10/1993 | Bronner et al. | ........ | 365/189.01 |
| 5,274,271 A | 12/1993 | McEwan | ............... | 307/108 |

(Continued)

FOREIGN PATENT DOCUMENTS

EP    0 307 962 A2    3/1989

(Continued)

OTHER PUBLICATIONS

"Radio Equipment and Systems (RES(; High Performance Radio Local Area Network (HIPERLAN), Type 1, Functional Specification", European Telecommunications Standards Institute, Dec. 1997.

(Continued)

*Primary Examiner*—John Pezzlo
*Assistant Examiner*—Hong Sol Cho
(74) *Attorney, Agent, or Firm*—Pulse-LINK, Inc.; Peter R Martinez; Steven A Moore

(57) ABSTRACT

Synchronization is maintained among a plurality of network devices having local clocks that participate in a network. A first packet is broadcast from a first network device to other network devices that participate in the network. The first packet includes a global time reference derived from the local clock of the first network device. The clocks of the network devices that receive the first packet are adjusted to be closer to the local clock of the first network device. A first network local time reference and a second network local time reference may be maintained for a device that participates in a first network and a second network. A free running clock is maintained on the device. The difference between the free running clock and a first network global time reference is determined. A first network offset is calculated to account for the difference between the free running clock and the first network global time reference. The difference between the free running clock and a second network global time reference is determined. A second network offset is calculated to account for the difference between the free running clock and the second network global time reference.

5 Claims, 8 Drawing Sheets

| 308 | 306 | 304 | 302 |
|---|---|---|---|
| Remainder of Packet | Global Time Reference (LSP) | Frame Sync Sequence | Clock Sync Sequence |

U.S. PATENT DOCUMENTS

| | | | | |
|---|---|---|---|---|
| 5,307,079 | A | 4/1994 | Ross et al. | 343/822 |
| 5,319,218 | A | 6/1994 | Kim et al. | 257/1 |
| 5,355,374 | A | 10/1994 | Hester et al. | 370/84 |
| 5,363,108 | A | 11/1994 | Fullerton | 342/27 |
| 5,473,668 | A | 12/1995 | Nakahara | 379/58 |
| 5,517,505 | A * | 5/1996 | Buchholz et al. | 370/350 |
| 5,537,414 | A | 7/1996 | Takiyasu et al. | 370/95.1 |
| 5,546,022 | A | 8/1996 | D'Souza et al. | 326/87 |
| 5,627,829 | A | 5/1997 | Gleeson et al. | 370/230 |
| 5,644,576 | A | 7/1997 | Bauchot et al. | 370/437 |
| 5,652,749 | A * | 7/1997 | Davenport et al. | 370/466 |
| 5,677,927 | A | 10/1997 | Fullerton et al. | 375/200 |
| 5,687,169 | A | 11/1997 | Fullerton | 370/324 |
| 5,687,200 | A | 11/1997 | Berger | 375/363 |
| 5,742,592 | A | 4/1998 | Scholefield et al. | 370/329 |
| 5,790,551 | A | 8/1998 | Chan | 370/458 |
| 5,815,537 | A | 9/1998 | Janssen | 375/350 |
| 5,832,035 | A | 11/1998 | Fullerton | 375/210 |
| 5,901,172 | A | 5/1999 | Fontana et al. | 375/200 |
| 5,909,469 | A | 6/1999 | Frodigh et al. | 375/302 |
| 5,926,501 | A | 7/1999 | Souissi et al. | 375/200 |
| 5,940,452 | A | 8/1999 | Rich | 375/347 |
| 5,952,956 | A | 9/1999 | Fullerton | 342/27 |
| 5,953,344 | A | 9/1999 | Dail et al. | 370/443 |
| 5,960,000 | A | 9/1999 | Ruszczyk et al. | 370/447 |
| 5,970,062 | A | 10/1999 | Bauchot | 370/345 |
| 5,977,822 | A | 11/1999 | Rybicki et al. | 329/313 |
| 6,014,374 | A | 1/2000 | Paneth et al. | 370/345 |
| 6,031,862 | A | 2/2000 | Fullerton et al. | 375/200 |
| 6,055,411 | A | 4/2000 | Ishida et al. | 455/11.1 |
| 6,069,887 | A * | 5/2000 | Geiger et al. | 370/338 |
| 6,091,717 | A | 7/2000 | Honkasalo et al. | 370/329 |
| 6,094,464 | A | 7/2000 | Ebringer et al. | 375/342 |
| 6,097,707 | A | 8/2000 | Hodzic et al. | 370/321 |
| 6,115,390 | A | 9/2000 | Chuah | 370/443 |
| 6,133,875 | A | 10/2000 | Kishimoto | 342/375 |
| 6,226,277 | B1 | 5/2001 | Chuah | 370/328 |
| 6,243,583 | B1 | 6/2001 | Tsutsui et al. | 455/442 |
| 6,246,377 | B1 | 6/2001 | Aiello et al. | 343/770 |
| 6,246,702 | B1 | 6/2001 | Fellman et al. | 370/503 |
| 6,275,544 | B1 | 8/2001 | Aiello et al. | 375/326 |
| 6,278,713 | B1 | 8/2001 | Campbell et al. | 370/417 |
| 6,285,662 | B1 | 9/2001 | Watanabe et al. | 370/280 |
| 6,285,873 | B1 | 9/2001 | Quick, Jr. | 455/422 |
| 6,292,153 | B1 | 9/2001 | Aiello et al. | 343/767 |
| 6,347,084 | B1 * | 2/2002 | Hulyalkar et al. | 370/347 |
| 6,480,483 | B1 * | 11/2002 | Yahata et al. | 370/503 |
| 6,560,215 | B1 * | 5/2003 | Bloem et al. | 370/347 |
| 6,628,642 | B1 * | 9/2003 | Mile'n et al. | 370/350 |
| 6,665,308 | B1 * | 12/2003 | Rakib et al. | 370/441 |
| 6,697,382 | B1 * | 2/2004 | Eatherton | 370/503 |
| 6,707,817 | B1 * | 3/2004 | Kadambi et al. | 370/390 |
| 6,707,828 | B1 * | 3/2004 | Wolf | 370/503 |
| 6,816,510 | B1 * | 11/2004 | Banerjee | 370/503 |
| 6,850,495 | B1 * | 2/2005 | Baum et al. | 370/256 |
| 6,901,106 | B1 * | 5/2005 | Chen et al. | 375/150 |
| 6,903,681 | B1 * | 6/2005 | Faris et al. | 342/357.06 |
| 6,909,728 | B1 * | 6/2005 | Kuribayashi et al. | 370/518 |
| 6,934,287 | B1 * | 8/2005 | Okamura | 370/389 |
| 2002/0131370 | A1 * | 9/2002 | Chuah et al. | 370/252 |
| 2003/0179625 | A1 * | 9/2003 | Tojima et al. | 365/200 |
| 2003/0206559 | A1 * | 11/2003 | Trackewsky et al. | 370/509 |
| 2005/0018754 | A1 * | 1/2005 | Song | 375/142 |

FOREIGN PATENT DOCUMENTS

| | | |
|---|---|---|
| EP | 0 817 399 A2 | 1/1998 |
| EP | 0 825 794 A2 | 2/1998 |
| EP | 0 817 399 A3 | 7/1998 |
| EP | 0 825 794 A3 | 1/2000 |
| EP | 0 307 962 A3 | 5/2000 |
| WO | WO 91/07030 A1 | 5/1991 |
| WO | WO 95/23461 A1 | 8/1995 |
| WO | WO 97/21294 A2 | 6/1997 |
| WO | WO 98/27670 A1 | 6/1998 |

OTHER PUBLICATIONS

J. Husted et al., "A Time-Division Multiple-Access System For The Defense Satellite Communication System", 1970 *Easco*, pp. 229-237, Oct. 1970.

L. Roberts, "Aloha Packet System With and Without Slots and Capture", *Computer Communication Review*. vol. 5, No. 2, pp. 28-41, Apr. 1975.

"IEEE Standards for Local Area Networks: Carrier Sense Multiple Access with Collision Detection", ANSI/IEEE Std. 802.3-1985, The Institute of Electronic and Electrical Engineers, pp. 1-143, Dec. 1984.

B. Schneier, *Applied Cryptography*. Chapter 10, Sec. 10.3, 12.2, pp. 216-220, 270-278, John Wiley & Sons, Inc., Oct. 1995.

"Information technology-Open Systems Interconnection-Basic Reference Model: The Basic Mode", *ISO/IEC 7498-1:1994(E)*, pp. 1-59, corrected and reprinted Jun. 15, 1996.

M. Win, "ATM-Based TH-SSMA Network for Multimedia PCS", *IEEE Journal on Selected Areas in Communication*. vol. 17, No. 5, pp. 824-836, May 1999.

Robert Aiello et al., "Baseband Wireless Network For Isochronous Communication", 56 pp. Specification, 6 pp. Claims, 6 Shts. Drawings, 1 p. Abstract, 09/393,126 filed Sep. 10, 1999.

S. Ramsey et al., "A Wireless Photoconductive Receiver Using Impulse Modulation and Direct Sequence Code Division", *Microwave Photonics*, pp. 265-268, Nov. 17, 1999.

* cited by examiner

GTR = FRC + FRCO

MAINTAINING A GLOBAL TIME REFERENCE AMONG A GROUP OF NETWORKED DEVICES

FIELD OF THE INVENTION

The present invention relates generally to networks of devices. More specifically, maintaining a global time reference in an ad hoc wireless network is disclosed.

BACKGROUND OF THE INVENTION

Wireless networks are becoming increasingly important as solutions for transferring data among devices that move, are located in a home, or are otherwise situated so that it is desirable to connect the devices without wires. Numerous physical and MAC layer solutions have been proposed. For example, a baseband ultra wideband wireless network is described in U.S. patent application Ser. No. 09/393,126 "Baseband Wireless Network for Isochronous Communication" by Aiello, et. al., which is herein incorporated by reference. An ultra wide band network transmits a signal that covers a very large portion of the frequency spectrum but transmits at a very low power in any individual frequency band.

Wireless networks are sometimes referred to as ad hoc networks because the network is comprised of devices that happen to be within the broadcast vicinity of the other devices in the network. Devices may join or leave the network as they are powered up or move out of range. A particular ad hoc network is described in the HIPERLAN Type 1, Functional Specification, ETS 300 652 published by the European Telecommunications Standards Institute. It is available at www.etsi.org.

FIG. 1 is a block diagram illustrating a set of wireless devices that communicate together in a wireless ad hoc network. Video player 102 transmits an audio signal to speakers 106a, 106b, 106c and 106d. Video player 102 also transmits a video signal to screen 104. Screen 104 and speakers 106 may also transmit information to each other or to video player 102.

For an application such as the one shown in FIG. 1, it is readily seen that synchronization among the various devices is important to achieve a desirable result. Different amounts of delay or jitter may exist in the signal paths between video player 102, speakers 106a and 106b, and screen 104. If the difference in delay is significant, then the video presentation shown on screen 104 may not be properly synchronized with the audio being played on the speakers. Even worse, if speaker 106a and speaker 106b are not properly synchronized, then the left and right stereo audio channels could become separated in time, resulting in an unpleasant audio experience. Thus, it would be useful if a method of synchronizing the devices in such a wireless network could be developed.

SUMMARY OF THE INVENTION

Accordingly, a system and method for maintaining a global time reference among a group of wireless devices participating in a wireless network is disclosed. It should be noted that the techniques described herein may also be applied to other networks including certain networks that transmit signals partially or wholly using wires, fiberoptic cables or other means. For the purposes of example, this specification will describe in detail a wireless network and in particular a wireless ad hoc network that uses the HIPERLAN standard. It should be appreciated that the invention is not limited to such a network and that the techniques described are applicable to many different types of networks.

In one embodiment, each device in a network maintains its own clock. Instead of designating the clock of one particular device as the master clock, each device transmits its own clock signal or part of its own clock signal when it sends a packet to other devices in the network. The devices receiving the packet read the clock signal and adjust their own clocks to the transmitted value. This clock adjustment is made in a manner that causes the clocks to smoothly approach a common value without oscillating in an unstable manner.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, synchronization is maintained among a plurality of network devices having local clocks that participate in a network. A first packet is broadcast from a first network device to other network devices that participate in the network. The first packet includes a global time reference derived from the local clock of the first network device. The clocks of the network devices that receive the first packet are adjusted to be closer to the local clock of the first network device.

In one embodiment, a first network local time reference and a second network local time reference are maintained for a device that participates in a first network and a second network. A free running clock is maintained on the device. The difference between the free running clock and a first network global time reference is determined. A first network offset is calculated to account for the difference between the free running clock and the first network global time reference. The difference between the free running clock and a second network global time reference is determined. A second network offset is calculated to account for the difference between the free running clock and the second network global time reference.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 2:
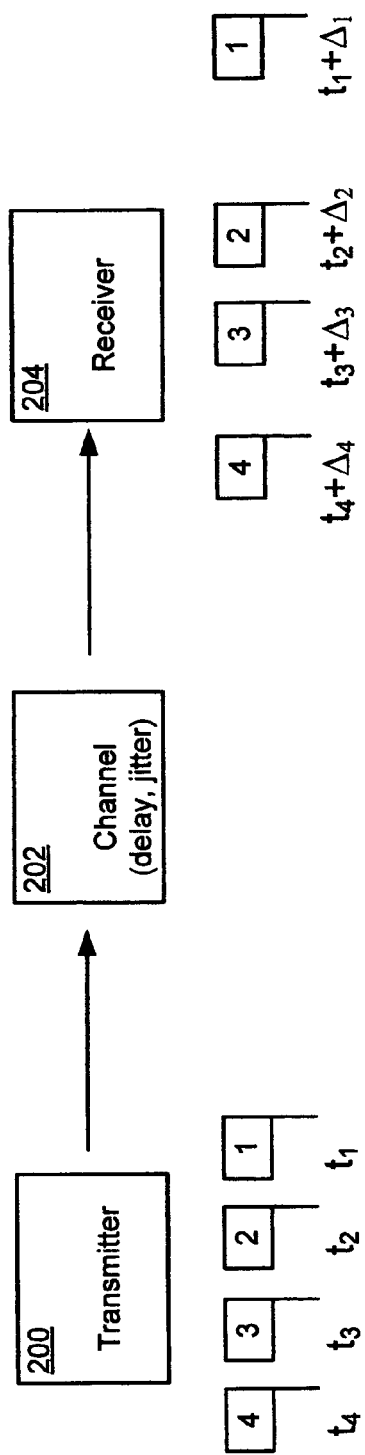
FIG. 2 is a diagram illustrating in some detail how a channel may introduce delay and jitter into the timing of packets sent from a transmitter to a receiver.

FIG. 2 is a diagram illustrating in some detail how a channel may introduce delay and jitter into the timing of packets sent from a transmitter to a receiver. Transmitter 200 sends packets in an isochronous manner. That is, each packet begins transmission at a regular interval. The difference in time between $t_1$, $t_2$, $t_3$, and $t_4$ is constant. Channel 202 introduces delay and jitter into the transmission so that $\Delta_1$, $\Delta_2$, $\Delta_3$, and $\Delta_4$ time delays are added to each of the times that the respective packets are received by the receiver 204. Thus, the evenly spaced transmitted packets are not evenly spaced when they are received.

So long as there is only one transmitter and one receiver, the inter packet timing can be corrected at the receiver if a timestamp is included at the beginning of each packet. The difference between each of the timestamps would indicate the correct relative time spacing of the packets enabling the receiver to reposition or perhaps even reorder the packets in time.

Figure 1:
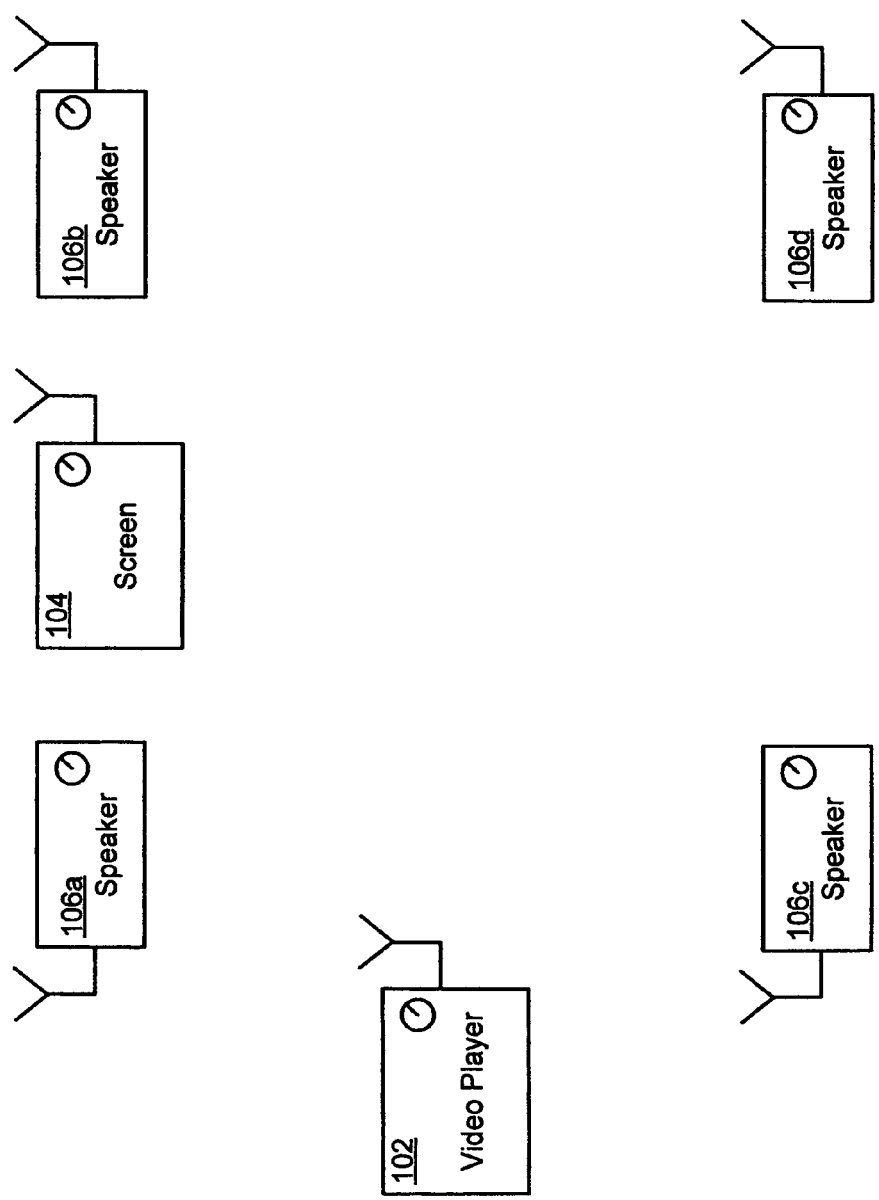
FIG. 1 is a block diagram illustrating a set of wireless devices that communicate together in a wireless ad hoc network.

When there are more than two devices, then simply timestamping the packets will not synchronize the display of data among the devices. It should also be noted that even when there are only two devices, the timestamp can adjust the relative spacing between packets but it does not facilitate making sure that events occur on the receiver at a specific time relative to an event occurring at the transmitter. Referring back to the example shown in FIG. 1, even if packets sent from video player 102 to left and right speakers 106a and 106b are timestamped, there may still be a time offset between the left and right stereo channels. The timestamp on the packets only serves to enable each of the channels to correctly position in time the packets that it receives.

In order to synchronize the video or audio display of information received in packets over the wireless network or otherwise coordinate the use of information received from packets, a clock is maintained on each of the network devices that is in synchronization with the clocks on each of the other network devices.

In one embodiment, a clock is specified for each network device that needs to be correct only to about 5 parts per million. In order to maintain acceptable synchronization between all of the device clocks on the network, each time one of the devices transmits a packet, the device includes in the packet header at a well defined point the value or, as described below, part of the value of its clock. When the other devices receive that packet, they adjust each of their respective clocks toward the time indicated by the timestamp. As described below, in one embodiment, the time adjustment is implemented by calculating a clock offset and the clock offset is calculated by taking half the difference between the device clock and the timestamp.

Figure 3:
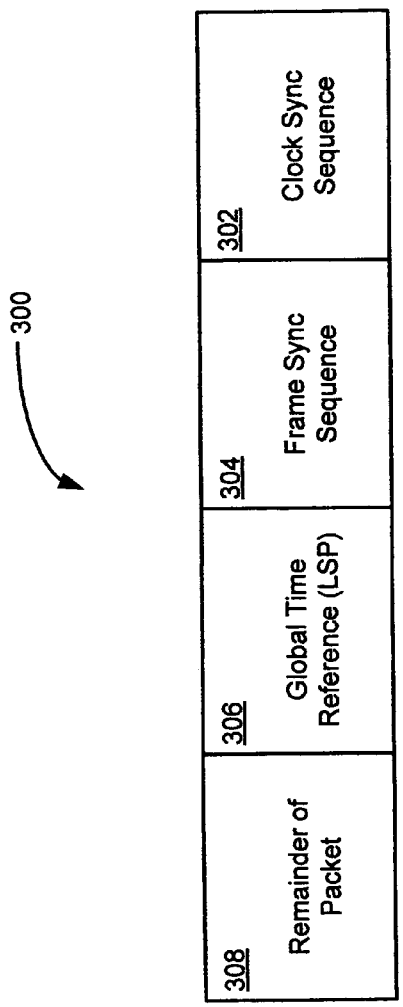
FIG. 3 is a diagram illustrating how the timestamp, referred to as the global time reference is inserted into a packet header.

FIG. 3 is a diagram illustrating how the timestamp, referred to as the global time reference is inserted into a packet header. Packet header 300 includes a clock sync sequence 302. Clock sync sequence 302 is chosen to be an appropriate sequence to facilitate the receiver acquiring a clock signal used to sample the remainder of the packet. Frame sync sequence 304 is included next for the purpose of precisely identifying the beginning of encoded data in the packet. Thus, the end of the frame sync sequence precisely determines the beginning of a frame. Any number of well known frame sync sequences may be used. In one embodiment, a 13 bit Barker code is used. As soon as the frame sequence is sent, the transmitter records its local time reference.

It should be noted that ideally, the local time reference of the transmitter will agree with the local time reference kept at each of the devices participating in the network. If that is the case, then each of the local time references actually is a global time reference because it is in agreement with every other local time reference in the system. For the purpose of this explanation, the local time reference that the transmitter records and then inserts in the packet will be referred to as the global time reference. That is because the transmitter asserts it to be the global time reference and it is the time that all receiving devices will adjust their own local time references toward. It should also be noted that each device considers its own local time reference to be the global time reference and asserts that its own local time reference is the global time reference it transmits a packet. Thus, each transmitting device asserts its local time reference as the global time reference when it includes its local time reference in a packet that it broadcasts to the other devices. Over time, as enough packets are sent, all of the local time references converge to the same global time and the broadcast global time reference results in only small, if any, changes by receiving devices.

Global time reference 306 is inserted in the packet after frame sync sequence 304. In the embodiment shown, the global time reference is inserted immediately after the frame sync sequence, but that is not required. The receiver notes its local time reference at the time when the frame sync sequence is detected and the frame sync sequence signal is asserted. The global time reference from the packet may be read immediately or it may be read much later, so long as it is compared to the time when the frame sync sequence signal is asserted. Thus, global time reference 306 may occur in the packet immediately following frame sync sequence 304 or may occur at a later point in the packet. The remainder of the packet 308 is then sent. The remainder of the packet will likely include further information for the packet header as well as finally the packet payload of data.

It should be noted that in one embodiment, the entire global time reference is not included in the packet. Instead, only the least significant bits, referred to as the least significant part, of the global time reference is included. It is sufficient to include just the least significant part of the global time reference so long as the difference between the clocks is less than the amount of time counted by the least significant part of the global time reference. This condition is met if the amount of drift between the clocks before an adjustment is made is not enough to move the clocks out of synchronization by more than the maximum amount of time that can be represented by the least significant part. In one embodiment, a 32 bit global time reference is used and the least significant part that is transmitted with each packet is the least significant 12 bits of the 32 bit global time reference.

In the embodiment described above, the relative clock drift of the clocks being used is about 5 parts per million (ppm) and the clock rate is 1 MHz. The least significant part of the global time reference can count up to $2^{12}$ microseconds. Therefore, the clocks would need to be updated before a $2^{12}$ microsecond error could accumulate. For a 1 MHz clock with 5 ppm accuracy, the maximum time interval between updates would be on the order of about 5 minutes, depending on the method of updating used. Of course, the maximum time interval varies in different systems depending on the speed and accuracy of the clock and the number of bits transmitted with the least significant part of the clock. If more of the global time reference is provided in the least significant part, then the frequency of update is lower. For example, if 14 bits are used, then the least significant part of the global time reference can accurately represent a cumulative drift of up to $2^{14}$ microseconds. Assuming that the relative clock drift is unchanged, then updates would be required only one fourth as often.

One advantage of the described arrangement where the global time reference is included along with every packet sent by one of the devices participating in the network is that as the amount of network traffic increases, updates of the local time references occur more frequently. This decreases the variance among the local time references.

Figure 4A:
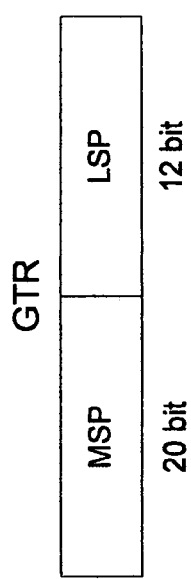
FIG. 4A is a diagram illustrating how the global time reference is split into a most significant part and a least significant part.

FIG. 4A is a diagram illustrating how the global time reference is split into a most significant part and a least significant part. As mentioned above, the most significant part is, in one embodiment, 20 bits and the least significant part is 12 bits. The size of the least significant part may be increased to reduce the required frequency of updates at the cost of requiring more overhead for transmission. It should also be noted that, in addition to the least significant part being included in packets that are sent by each of the devices, periodically a MAC layer protocol prompts one or more of the devices to broadcast the entire global time reference, that is both the most significant part and the least significant part. In one embodiment, the global time reference is broadcast every 20 seconds. The reason for periodically broadcasting the entire global time reference is to allow for an error that occurred in one of the devices that changed the global time reference by more than the maximum time represented by the least significant part of the global time reference to be corrected.

In different embodiments, the task of broadcasting the entire global time reference may be performed by either one or all of the devices participating in the network. For example, each device may be directed to broadcast the global time reference periodically. The periodic broadcast may be staggered. Alternatively, the MAC layer protocol may direct a designated device to broadcast the entire global time reference at certain intervals.

Figure 4B:
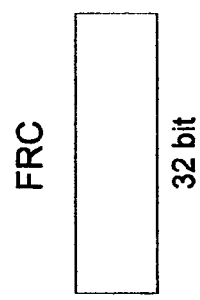
FIG. 4B is a diagram illustrating a memory register that stores the free running clock. The free running clock is a 32 bit clock.

FIG. 4B is a diagram illustrating a memory register that stores the free running clock. The free running clock is a 32 bit clock. As mentioned previously, in one embodiment, the clock is a 1 megahertz clock. In other embodiments, the clock rate may be set as desired. Preferably, the free running clock is read only. That is, adjustments to the global time reference are not written to the clock. Rather, a free running clock offset is defined such that the global time reference is equal to the sum of the free running clock plus the free running clock offset.

Figure 4C:
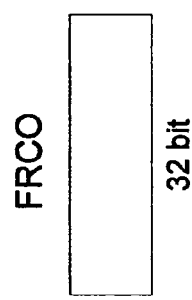
FIG. 4C is a diagram illustrating a memory register that stores the free running clock offset.

FIG. 4C is a diagram illustrating a memory register that stores the free running clock offset. Like the free running clock, the free running clock offset is a 32 bit register. However, the free running clock offset may be written as well as read. Each time a global time reference is received from one of the other devices, the free running clock is adjusted so that the sum of the free running clock and the free running clock offset converges toward the global time reference specified by the broadcasting device.

In different embodiments, adjustments to the local time reference based on the received global time reference are made according to different schemes. In one embodiment, a linear adjustment to the local time reference is made based on the difference between the received global time reference and the local time reference. The adjustment may be represented by the equation:

$$\Delta FRCO = (GTR - LTR) * L.$$

Where $\Delta FRCO$ is the change in the free running clock offset. GTR is the global time reference received with a packet. LTR is the current value of the local time reference stored by the device. As mentioned above, after several packets are received and adjustments are made, the local time references stored on each of the devices will converge toward a single value and that value will be the global time reference. L is a linear factor that adjusts the amount that the free running clock offset is adjusted compared to the difference between the global time reference and the local time reference that is computed. In one embodiment, L is equal to 0.5 and the adjustment to the free running clock offset is equal to half the difference between the received global time reference and the stored local time reference.

Adjustment schemes are used in different embodiments that make non-linear adjustments to the free running clock offset based on the difference between the global time reference and the local time reference. In one embodiment, the change to the free running clock offset is equal to a scaling factor times the square of the difference between the global time reference and the local time reference. Squaring the difference between the two references has the advantage of making greater changes to the free running clock offset if the difference between the global time reference and the local time reference is large. If the square of the difference is used, then the sign of the difference between the global time reference and the local time reference is computed and applied to the difference so that the free running clock offset is adjusted in the proper direction.

In another embodiment, another non-linear adjustment scheme is implemented to allow the system to be more robust. The difference between the global time reference and the local time reference is computed. If the difference is greater than a threshold, then no adjustment is made to the local time reference. If the difference is less than a threshold, then the adjustment is made. Thus, if one of the devices in the network malfunctions or a new device signing on to the network attempts to assert a global time reference that is incorrect and would perturb the global time reference agreed upon by the current devices in the network, that device's assertion of the global time reference may be ignored.

In some embodiments, the threshold test can be turned off under certain circumstances. For example, if more than a certain number of changes are rejected by a device, then the threshold function may be temporarily turned off. This would be appropriate since a device that is receiving a large number of global time references that differ from its local time reference by a great amount most likely is actually incorrect by a large amount. A counter may be used to count the number of recent times that the difference between a received global time reference and the local time reference exceeds the threshold. In one embodiment, the counter is programmed to only count global time references from unique sources so that a single inaccurate source broadcasting repeatedly will be ignored. Both the threshold and the number of times that the threshold must be exceeded to turn off the threshold test may be programmed or may be preset.

Figure 5:
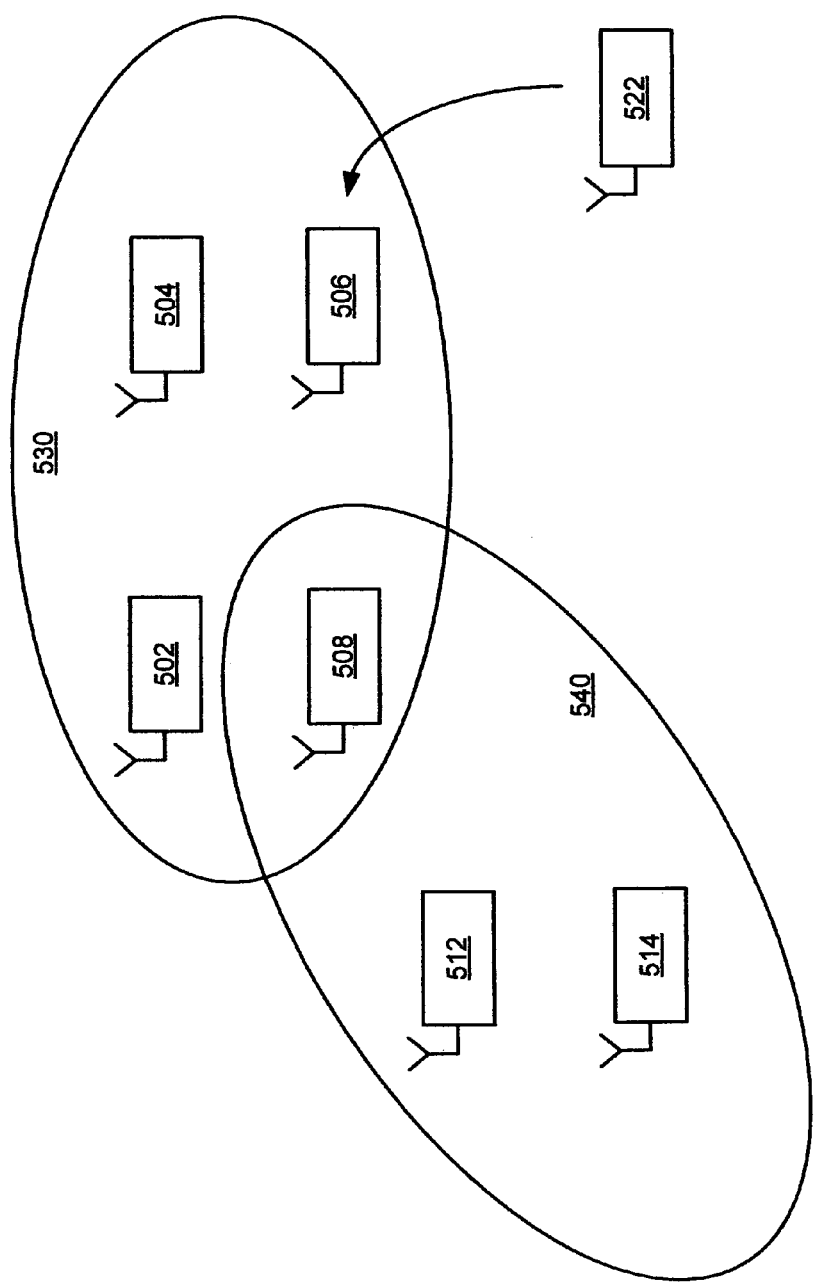
FIG. 5 is a diagram illustrating an embodiment where devices belong to two different ad hoc networks and a new device is joining one of the networks.

FIG. 5 is a diagram illustrating an embodiment where devices belong to two different ad hoc networks and a new device is joining one of the networks. Devices 502, 504, 506, and 508 all belong to a first ad hoc network 530. Device 508 along with devices 512 and 514 also belong to an ad hoc network 540. Device 522 is requesting to join network 530. As mentioned above, in one embodiment, the HIPERLAN protocol is utilized by the wireless ad hoc networks. In such an embodiment, each network has its own HIPERLAN ID. The HIPERLAN ID is included in packets sent by devices.

The two separate networks can have two separate independent clocks with a device such as device 508 that participates in both networks maintaining two separate clocks. More precisely, the device need only maintain a single free running clock and keep track of two free running clock offsets. Changes are applied to each of the respective free running clock offsets to keep track of the two different global times for the networks. Thus, device 508 may have a single free running clock but two registers used to calculate two different free running clock offsets to adjust the free running clock time to the global time of whichever network it is participating in at a given moment.

Other aspects of the HIPERLAN specification are used to facilitate the implementation of a global time reference shared among the devices of an ad hoc network. For example, the entire global time reference may be periodically broadcast using a Hello packet as described in the specification. The standard Hello procedure is modified to carry the full global time reference. The Hello procedure is described more fully in the HIPERLAN Type 1, Functional Specification, ETS 300 652 at 6.5.4 Neighbour Information Declaration. See also 6.1.14 Neighbour Information Base and 6.1.15 Hello Information Base.

As described above, a device may use the HIPERLAN ID to determine whether a packet belongs to its network and therefore whether to adjust its local time reference toward the global time reference specified in the packet. Also, a reserved network management ID may be used by devices joining the network. Network devices may be configured to ignore time references included in HIPERLAN lookup requests.

Various methods may be implemented to avoid a stable network global time reference from being perturbed by a new device. In one embodiment, new devices are instructed to provide a global time reference of all 0's which is a special value that is ignored by all network devices. Also, a new device is preferably configured to initially set its local time reference to equal a received global time reference instead of adjusting its local reference as described above. Specification of conventions for new devices, however, does not protect against rogue devices that do not observe the correct conventions or devices that belong to other networks. For that reason, other procedures such as checking the HIPERLAN ID or rejecting certain large changes may also be implemented.

Figure 6:
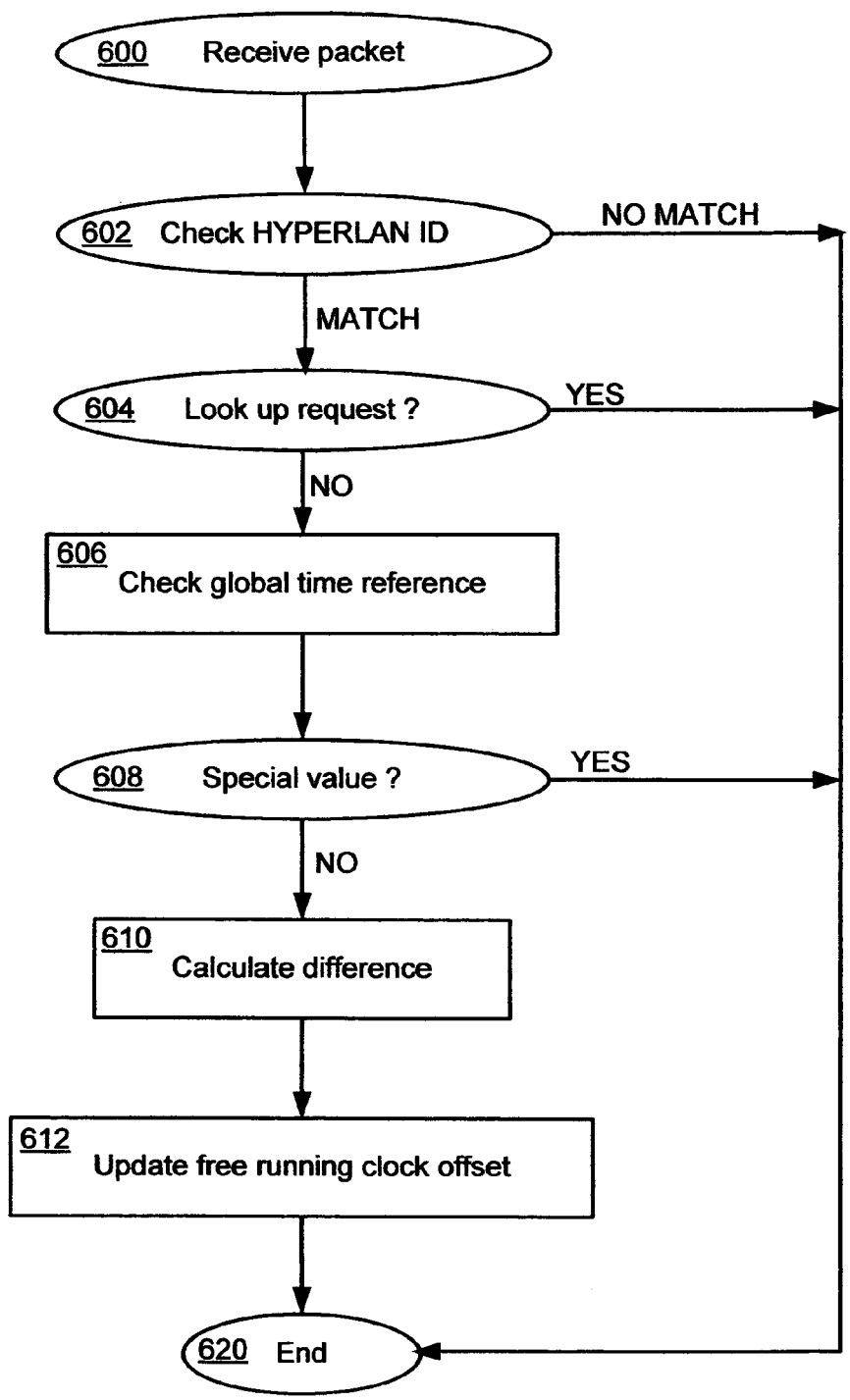
FIG. 6 is a flow chart illustrating a process that a network device executes when a packet that includes a global time reference is received to determine whether to adjust the network device local time reference.

FIG. 6 is a flow chart illustrating a process that a network device executes when a packet that includes a global time reference is received to determine whether to adjust the network device local time reference. The process starts at 600. In step 602, the HIPERLAN ID is checked. If there is no match, then the process ends at 620. If there is a match, then control is transferred to step 604 and it is determined whether the packet is a look up request. If the packet is a look up request, then the process ends at 620. If the packet is not a lookup request, then control is transferred to step 606 and the global time reference is checked. In step 608, it is determined whether the global time reference is a special value. If it is, then control is transferred to 620 and the process ends. If the global time reference is not a special value, then control is transferred to step 610 and the difference between the global time reference and the local time reference is calculated. Then, in step 612, the free running clock offset is updated. The free running clock may be updated according to any of the linear or nonlinear schemes described above or any other appropriate scheme. The process then ends at 620.

Figure 7A:
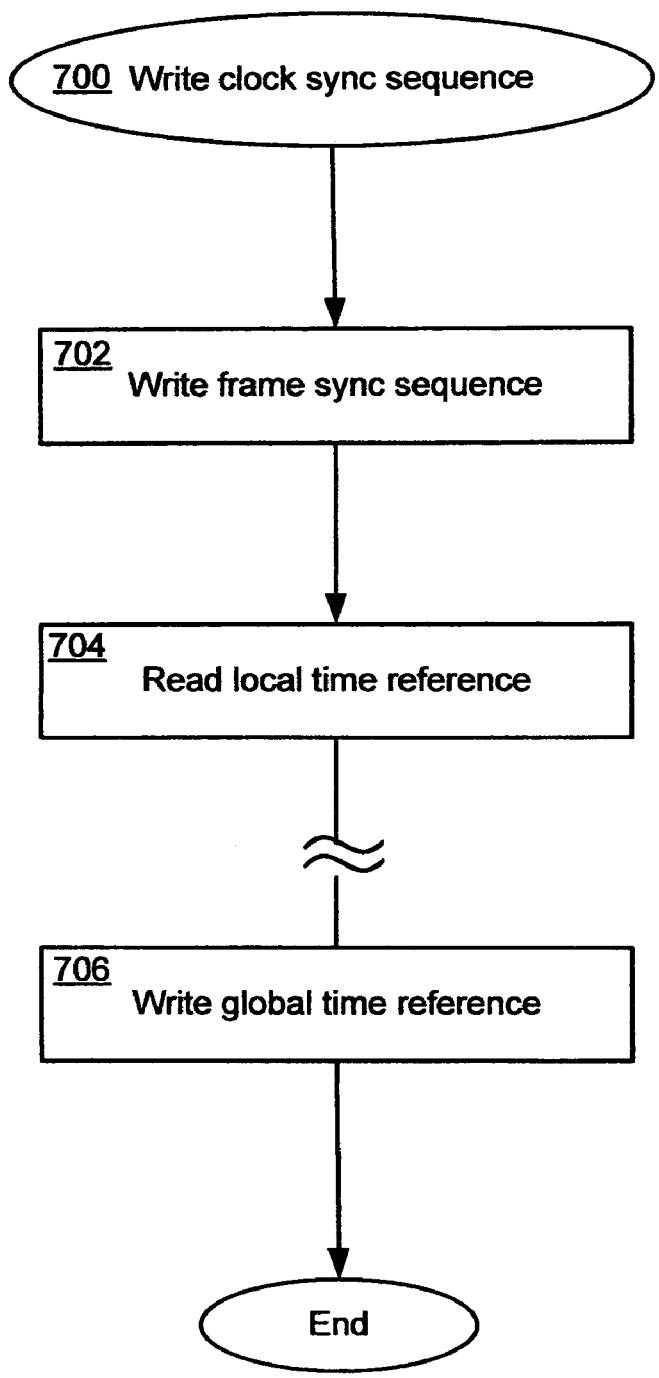
FIG. 7A is a flow chart illustrating a process for including a global time reference in a packet.

FIG. 7A is a flow chart illustrating a process for including a global time reference in a packet. The process starts at 700 when a clock sync sequence is written. Next, in step 702, the frame sync sequence is written. As soon as the frame sync sequence is completed the local time reference of the transmitting device is read in step 704. This value will be inserted into the packet as the global time reference corresponding to the time that the frame sync sequence was finished. Next, in step 706, the global time reference is written into the packet. It should be noted that other steps may intervene between steps 704 and 706. The key point is that the global time reference is stored either immediately after or at some specific time after the frame sync sequence is completed so that the receiving device can compare its local time reference to the transmitted global time reference at a specific reference point.

Figure 7B:
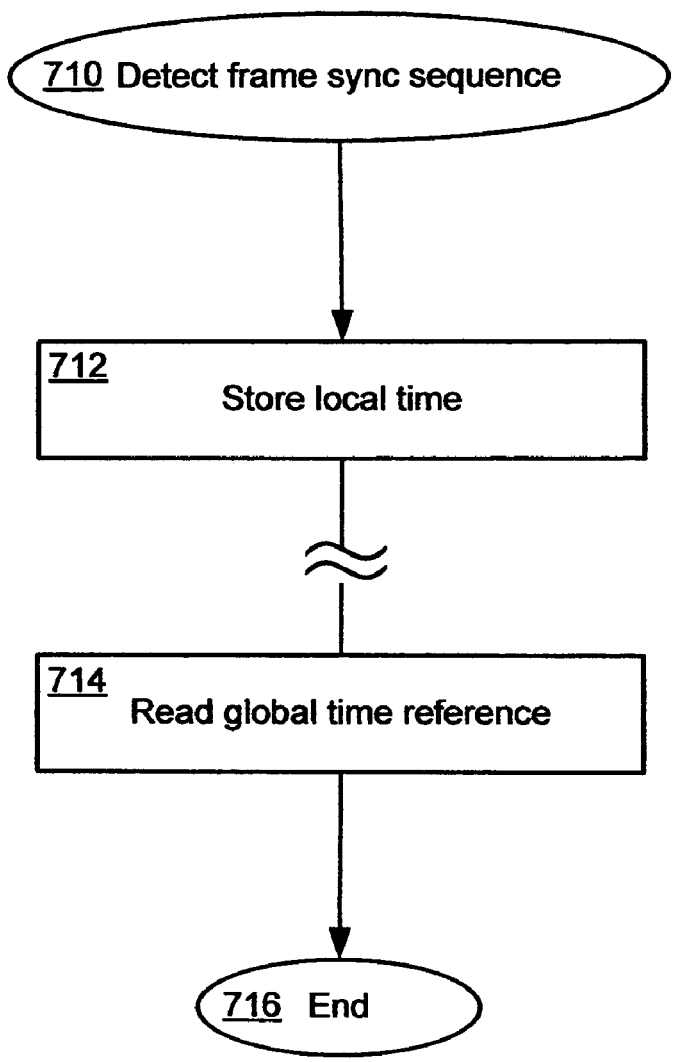
FIG. 7B is a flow chart illustrating a process executed by a receiver to prepare to update its free running clock offset.

FIG. 7B is a flow chart illustrating a process executed by a receiver to prepare to update its free running clock offset. The process starts at 710 when the frame sync sequence is detected. The local time is immediately stored in step 712. It should be noted that although it is preferred that the local time be stored immediately, it is also possible to store the local time at a set period of time after the assertion of the frame sync signal. Then, in step 714, the global time reference is read from the packet. In this manner, the transmitted global time and the local time are stored at a specific point in time referenced to the writing of the frame sync sequence and the detection of the frame sync sequence, respectively. In this manner, the local time reference and the global time reference can be compared and the free running clock offset can be appropriately adjusted.

Maintaining a global time reference in an ad hoc network has been disclosed. Each device maintains a local free running clock and a local free running clock offset, which together comprise a local time reference. Each free running clock is adjusted toward a received global time reference that is the local time reference of whatever device happens to be broadcasting. In this manner, eventually all of the local time references of devices in the network converge. A device may participate in more than one network by keeping track of one free running clock offset for each network.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of maintaining synchronization among a plurality of network devices having local clocks that participate in a network comprising:
   broadcasting a first packet from a first network device to other network devices that participate in the network wherein the first packet includes a global time reference derived from the local clock of the first network device; and
   adjusting the clocks of the network devices that receive the first packet to be closer to the local clock of the first network device;
   wherein the global time reference includes a least significant part of the local clock of the first network device and does not include a most significant part of the local clock of the first network device.

2. A method of maintaining synchronization among a plurality of network devices having local clocks that participate in a network comprising:
   broadcasting a first packet from a first network device to other network devices that participate in the network wherein the first packet includes a global time reference derived from the local clock of the first network device; and
   adjusting the clocks of the network devices that receive the first packet to be closer to the local clock of the first network device;
   wherein the global time reference includes a least significant part of the local clock of the first network device and does not include a most significant part of the local clock of the first network device, and wherein the most significant part of one of the network device local clocks is broadcast periodically and the most significant parts of all local clocks are conformed to the broadcast most significant part.

3. A method of maintaining synchronization among a plurality of network devices having local clocks that participate in a network comprising:
   broadcasting a first packet from a first network device to other network devices that participate in the network wherein the first packet includes a global time reference derived from the local clock of the first network device; and
   adjusting the clocks of the network devices that receive the first packet to be closer to the local clock of the first network device;
   wherein adjusting the clocks of the network devices that receive the first packet to be closer to the local clock of the first network device includes adjusting the clocks of the network devices by approximately one half the difference between the broadcast global time reference and the unadjusted value of the clock being adjusted.

4. A method of maintaining synchronization among a plurality of network devices having local clocks that participate in a network comprising:
   broadcasting a first packet from a first network device to other network devices that participate in the network wherein the first packet includes a global time reference derived from the local clock of the first network device; and
   adjusting the clocks of the network devices that receive the first packet to be closer to the local clock of the first network device;
   wherein adjusting the clocks of the network devices that receive the first packet to be closer to the local clock of the first network device includes adjusting the clocks of the network devices according to a nonlinear function of the difference between the unadjusted value of the clock being adjusted and the broadcast global time reference.

5. A method of maintaining synchronization among a plurality of network devices having local clocks that participate in a network comprising:
   broadcasting a first packet from a first network device to other network devices that participate in the network wherein the first packet includes a global time reference derived from the local clock of the first network device; and
   adjusting the clocks of the network devices that receive the first packet to be closer to the local clock of the first network device;
   wherein adjusting the clocks of the network devices that receive the first packet to be closer to the local clock of the first network device includes adjusting the clocks of the network devices according to a nonlinear function of the difference between the unadjusted value of the clock being adjusted and the broadcast global time reference, and wherein the nonlinear function of the difference between the unadjusted value of the clock being adjusted and the broadcast global time reference causes substantially no adjustment to the clock being adjusted when the difference between the unadjusted value of the clock being adjusted and the broadcast global time reference is greater than a maximum adjustable difference.

* * * * *